April 27, 1948.  G. KAELIN ET AL  2,440,513
SMOKEHOUSE RACK
Filed Sept. 3, 1946

INVENTORS
Gottfried Kaelin
C. G. Garey
BY
ATTYS

Patented Apr. 27, 1948

2,440,513

UNITED STATES PATENT OFFICE 2,440,513

SMOKEHOUSE RACK

Gottfried Kaelin and Calavah G. Garey, Sacramento, Calif.

Application September 3, 1946, Serial No. 694,578

8 Claims. (Cl. 211—178)

1

This invention is directed to, and it is an object to provide, a novel rack for use in commercial smokehouses for the support of the meat or other foodstuffs being treated; the rack being trolley suspended from a rail, and arranged for ready and easy collapse to compact form when not in use, thereby facilitating its movement on the rail between unloading and loading points in the establishments.

Another object of the invention is to provide a collapsible, trolley suspended rack, for the purpose described, which includes novel means arranged to maintain the rack in stable, unfolded position for use, but readily manually releasable for collapse of said rack.

A further object of the invention is to provide a simple and rugged smokehouse rack, and yet one which will be exceedingly effective for the purpose for which it is designed.

These objects are accomplished by means of such structure and relative arrangement of parts as will fully appear by a perusal of the following specification and claims.

Figure 1:
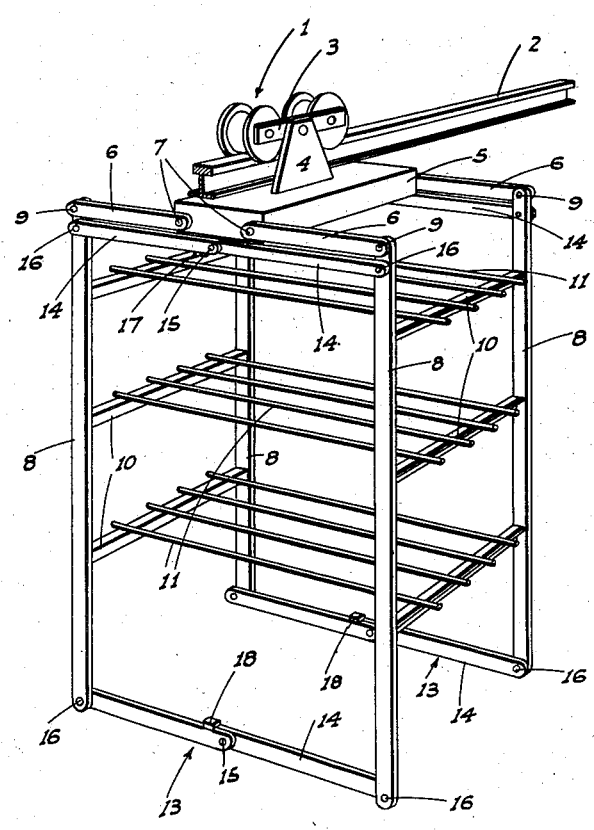
Fig. 1 is a perspective view of the rack in unfolded position and ready for use.

Referring now more particularly to the characters of reference on the drawings, the rack is suspended from a trolley, indicated generally at 1, which runs on a horizontal overhead rail 2; such rail leading through the establishment between loading and unloading points and the smoke room where supported meat or foodstuff is treated.

The trolley 1 comprises a roller carriage 3 carried on the rail 2 and having a depending bracket 4 to which is attached a rectangular head 5 disposed for travel directly beneath said rail. The rack is suspended from the rectangular head 5 and comprises a pair of swing links 6 pivoted, at one end, as at 7, to the head 5 at each end thereof, and projecting laterally in opposite directions; said links being substantially horizontal when the rack is unfolded for use, as in Fig. 1.

Vertical corner posts 8 are pivoted at their upper ends, as at 9, to the ends of the laterally projecting links 6 remote from the head 5.

On opposite sides of the rack corresponding corner posts 8 are connected by vertically spaced cross bars 10, and matching cross bars on opposite sides of the rack support removable horizontal rods 11 disposed in spaced-apart relation.

2

The meat or foodstuff to be treated is placed on the shelves formed by the rods 11, or suspended from said rods.

The rack is maintained unfolded for use, and with the parts thereof in the positions shown in Fig. 1, by means of a downwardly folding brace link unit 12 and an upwardly folding brace link unit 13 connected between the corner posts 8 at each end of the rack adjacent the top and bottom thereof, respectively.

The folding brace link units 12 and 13 each comprise a pair of cooperating links 14 pivoted together at adjacent ends, as at 15, and pivoted at the outer ends of said links to corresponding corner posts 8, as at 16.

Stops 17 and 18 prevent upward and downward buckling of the brace link units 12 and 13, respectively, whereby when said units are extended or unfolded, as in Fig. 1, they effectively maintain the rack stable for use.

As shown, the downwardly folding brace link units 12 are disposed closely adjacent but below the corresponding links 6, whereby said units 12 may fold downwardly without obstruction.

Figure 2:
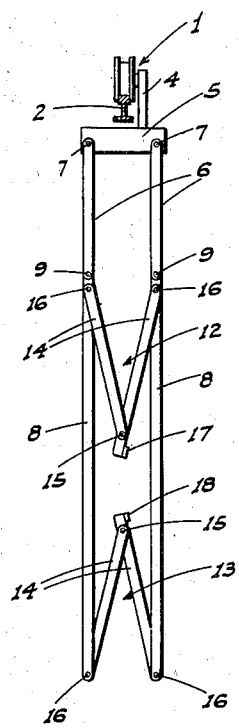
Fig. 2 is an elevation of the rack taken from one end thereof, and showing said rack in folded position.

When the described rack is in use, it is unfolded at the loading point, and the removable rods 11 placed in position between the cross bars 10. The rack is then loaded by placing the meat or foodstuff to be treated on the rods 11 or suspended therefrom. After the rack is loaded it is run on the rail 2 into the smokehouse, where the smoking process takes place. When this process is complete the rack is again run on the rail 2 to a point for unloading and when said rack is emptied the rods 11 are removed and the brace link units 12 and 13 are folded downwardly and upwardly, respectively, as shown in Fig. 2. When this occurs the laterally projecting links 6 swing downwardly to a depending position, and from which links the corner posts 8 are then suspended in substantial alinement. In this manner the rack is collapsed laterally to a very compact form, and of no greater width than the head 5 of the trolley 1. As so collapsed the trolley suspended rack may be run on the rail from the unloading point back to the loading point, while obstructing a minimum of floor space.

The length of the links 6, and connected corner posts 8, are such that even when the rack is in its collapsed position of Fig. 2, the lower end of said rack runs in clearance relation to the floor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A collapsible rack comprising a rectangular head, a pair of swing links pivotally connected at one end to each end of the head and projecting laterally in opposite directions therefrom when the rack is unfolded, a substantially vertical corner post pivoted at its upper end on and depending from the other end of each swing link, vertically spaced cross bars connected between corresponding corner posts on each side of the rack, corresponding cross bars on opposite sides of the rack being horizontally alined, rods extending between and removably engaging said alined, corresponding cross bars, and releasable means operative to prevent downward swinging of said links from their laterally projecting position.

2. A collapsible rack comprising a rectangular head, a pair of swing links pivotally connected at one end to each end of the head and projecting laterally in opposite directions therefrom when the rack is unfolded, a substantially vertical corner post pivoted at its upper end on and depending from the other end of each swing link, vertically spaced cross bars connected between corresponding corner posts on each side of the rack, corresponding cross bars on opposite sides of the rack being horizontally alined, rods extending between and removably engaging said alined, corresponding cross bars, and releasable means operative to prevent downward swinging of said links from their laterally projecting position; said releasable means including a foldable brace link unit pivotally connected between the corner posts at each end of the rack.

3. A collapsible rack comprising a rectangular head, a pair of swing links pivotally connected at one end to each end of the head and projecting laterally in opposite directions therefrom when the rack is unfolded, a substantially vertical corner post pivoted at its upper end on and depending from the other end of each swing link, vertically spaced cross bars connected between corresponding corner posts on each side of the rack, corresponding cross bars on opposite sides of the rack being horizontally alined, rods extending between and removably engaging said alined, corresponding cross bars, and releasable means operative to prevent downward swinging of said links from their laterally projecting position; said releasable means including a vertically spaced pair of foldable brace link units pivotally connected between the corner posts at each end of the rack.

4. A collapsible rack as in claim 2 in which each vertically spaced pair of foldable brace link units comprises a lower unit which folds upward, and an upper unit which folds downward.

5. A collapsible rack as in claim 2 in which each vertically spaced pair of foldable brace link units comprises a lower unit which folds upward, and an upper unit which folds downward; there being stops on said brace link units operative to prevent the lower and upper unit of each pair from folding downwardly and upwardly, respectively, beyond dead center.

6. A collapsible rack comprising a rectangular head, four upstanding corner posts disposed in symmetrical relation below the head, vertically spaced cross bars connecting pairs of the corner posts to form the sides of the rack, means pivotally connecting the sides of the rack for inward movement from positions laterally outwardly of the head on opposite sides thereof, means operative to releasably maintain the sides of the rack in said laterally outward positions, and rods removably engaged with and extending between corresponding cross rods of the sides of the rack.

7. A collapsible rack comprising a rectangular head, four upstanding corner posts disposed in symmetrical relation below the head, vertically spaced cross bars connecting pairs of the corner posts to form the sides of the rack, means pivotally connecting the sides of the rack for inward movement from positions laterally outwardly of the head on opposite sides thereof, means operative to releasably maintain the sides of the rack in said laterally outward positions, and rods removably engaged with and extending between corresponding cross rods of the sides of the rack; said connecting means being swing links pivotally attached between the head and the corner posts.

8. A collapsible rack comprising a rectangular head, four upstanding corner posts disposed in symmetrical relation below the head, vertically spaced cross bars connecting pairs of the corner posts to form the sides of the rack, means pivotally connecting the sides of the rack for inward movement from positions laterally outwardly of the head on opposite sides thereof, means operative to releasably maintain the sides of the rack in said laterally outward positions, and rods removably engaged with and extending between corresponding cross rods of the sides of the rack; said last named means comprising foldable brace link units connected between corresponding ones of the corner posts at opposite ends of the sides of the rack.

GOTTFRIED KAELIN.
CALAVAH G. GAREY.

REFERENCES CITED

The following references are of record in the file of this patent:

UNITED STATES PATENTS

| Number | Name | Date |
| --- | --- | --- |
| 802,826 | Ryder et al. | Oct. 24, 1905 |
| 1,297,680 | Hanak | Mar. 18, 1919 |
| 1,626,507 | Camper | Apr. 26, 1927 |
| 1,662,586 | Newman | Mar. 13, 1928 |
| 1,871,608 | Hallinan | Aug. 16, 1932 |
| 2,015,548 | Carter | Sept. 24, 1935 |
| 2,084,661 | Wagstaff | June 22, 1937 |

FOREIGN PATENTS

| Number | Country | Date |
| --- | --- | --- |
| 3,868 | Great Britain | Feb. 17, 1910 |